US006659752B1

(12) United States Patent
Lindqvist (10) Patent No.: US 6,659,752 B1
(45) Date of Patent: Dec. 9, 2003

(54) MOLD FOR COMPONENT WITH IN-MOLD DECORATION

(75) Inventor: Lars Lindqvist, Apex, NC (US)

(73) Assignee: Elster Electrically, LLC, Horsham, PA (US)

( * ) Notice: Subject to any disclaimer, the term of this patent is extended or adjusted under 35 U.S.C. 154(b) by 164 days.

(21) Appl. No.: 09/998,879

(22) Filed: Oct. 31, 2001

(51) Int. Cl.[7] .............................................. B29C 43/36
(52) U.S. Cl. ...................................... 425/123; 425/127
(58) Field of Search ................................ 425/123, 127

(56) References Cited

U.S. PATENT DOCUMENTS

| 3,654,002 A | * | 4/1972 | Wiltshire et al. ........... 156/62.4 |
| 3,668,034 A | | 6/1972 | Nicholas et al. ............. 156/245 |
| 4,369,157 A | | 1/1983 | Conner ........................ 264/246 |
| 5,173,313 A | * | 12/1992 | Sato et al. .................... 425/183 |
| 5,500,169 A | | 3/1996 | Kondo et al. ............... 264/46.5 |
| 5,509,990 A | | 4/1996 | Masui et al. ................. 156/242 |
| 5,512,226 A | | 4/1996 | Rosica et al. ................ 264/132 |
| 5,676,981 A | | 10/1997 | Miyazawa et al. ........... 425/112 |
| 5,707,581 A | | 1/1998 | Yamazaki .................... 264/511 |
| 5,962,034 A | | 10/1999 | Matsumoto et al. ......... 425/111 |
| 6,045,738 A | | 4/2000 | Atake .......................... 264/266 |
| 6,071,456 A | | 6/2000 | Hanamoto et al. .......... 264/265 |
| 6,143,227 A | | 11/2000 | Heiden et al. ............... 264/267 |
| 6,207,090 B1 | | 3/2001 | Knisely et al. .............. 264/138 |

* cited by examiner

Primary Examiner—Robert Davis
Assistant Examiner—Joseph S Del Sole
(74) Attorney, Agent, or Firm—Woodcock Washburn LLP (57) ABSTRACT

A mold assembly accepts a flexible inserted decoration sheet and molds a cylindrical component to include the inserted decoration sheet. The mold assembly has a female part a male part insertable thereinto such that the component is molded therebetween from an introduced mold material. The female part includes a circular wall, a cylindrical wall, and a pair of demarcating ridges on the cylindrical wall. The pair of ridges accept the inserted decoration therebetween and hold the inserted decoration against the cylindrical wall such that the introduced mold material stays substantially on a side of the inserted decoration opposite the cylindrical wall of the female part.

10 Claims, 5 Drawing Sheets

MOLD FOR COMPONENT WITH IN-MOLD DECORATION

FIELD OF THE INVENTION

The present invention relates to a mold for a relatively tall-sided component that includes an in-mold decoration sheet. In particular, the present invention relates to such a mold for a component having a generally cylindrical wall, such as an electric meter face cover, where the in-mold decoration sheet forms at least a portion of the exterior of the cylindrical wall.

BACKGROUND OF THE INVENTION

An electric meter or the like typically includes internal machinery and/or circuitry for metering electricity and a meter display for being read by a meter reader, a customer, etc. The meter display may be electronic or mechanical in nature. Especially in the case where the meter display is mechanical, such display typically protrudes from a meter housing, and therefore must be covered by a display cover that protects the display from external elements and that allows a meter reader, customer, etc. to read the display.

Typically, the display cover is generally cylindrical with opposing generally circular ends, where one end is closed and the other end is open. Thus, the display cover is mounted to the meter housing at the open end, the meter display protrudes from the meter housing into the display cover through the open end, and the display is read through the closed end. Although by no means definitive, a display cover may have an approximate cylindrical diameter of about 6 inches and an approximate cylindrical height of about 5 inches and has a wall thickness of about 0.1 to 0.12 inches.

Typically, the display cover is formed in a mold as a generally unitary body from an elastomeric or plastic material or the like such as a clear polycarbonate. In at least some instances, it is desirable as part of the molding process to include within the mold an in-mold decoration sheet so that the molded display cover includes the in-mold decoration sheet. For example, when molding the display cover from a clear polycarbonate, it may be desirable to include in the mold an opaque-tint UV-resistant in-mold decoration sheet that forms at least a portion of the cylindrical part of the molded display cover. Accordingly, the opaque-tint UVF-resistant decoration imparts the formed display cover with a UV-resistant cylindrical wall which can act to shade the meter display from exposure to the sun and to prevent dangerous heat build-up on the meter display from exposure to the sun. Of course, the in-mold decoration may also include words, pictures, decorative designs, logos, etc.

Owing to the general structure of the molded cover, the forming mold for such cover generally includes a female part generally corresponding to the exterior surface of the cover and a male part generally corresponding to the interior surface of the cover, where the male part is inserted within the female part such that the cover is molded therebetween. Accordingly, each of the male and female parts includes a generally cylindrical wall corresponding to and defining a cylindrical wall of the cover and a generally circular wall corresponding to and defining a circular end of the cover.

The in-mold decoration may be formed from any appropriate material. In the case of a UV-resistant opaque-tint decoration for a meter display cover, the material may be a polycarbonate similar to if not identical with the polycarbonate molded to form the remainder of the cover, although of course with a UV-resistant opaque tint. Such decoration is generally a strip having a width generally corresponding to the cylindrical height of the display cover and a length generally corresponding to the cylindrical circumference of the display cover such that the decoration is substantially coextensive with the cylindrical wall of the formed display cover. The decoration is flexible enough to be curved along the length thereof and inserted within the female part of the forming mold such that the decoration covers substantially the entire circumferential extent of the cylindrical wall of the such female part. With such decoration inserted, the male part of the forming mold is coupled to the female part to form a void, and the forming polycarbonate is appropriately introduced to the void to form the display cover.

Significantly, in the course of molding the display cover, the inserted decoration should be held closely to the cylindrical wall of the female part of the mold such that the introduced polycarbonate stays substantially on the side of the inserted decoration opposite the cylindrical wall of the female part (i.e., interior to the inserted decoration). The decoration should not be allowed to buckle or crumple within the mold such that the introduced polycarbonate migrates to the side of the inserted decoration facing the cylindrical wall of the female part (i.e., exterior to the inserted decoration). Otherwise, the migrating polycarbonate could stretch or tear the inserted decoration, resulting in color discontinuities or variations appearing in the finished display cover. As may be appreciated, such color discontinuities or variations are aesthetically displeasing at a minimum, and functionally impairing at a maximum.

To prevent such buckling and crumpling in the decoration as inserted in the female part of the mold, such decoration may be provided with a relatively short width, realizing that the likelihood of such buckling and crumpling increases with such width. However, a relatively short width may not be an available option, such as in the case of a meter display cover with a cylindrical diameter of about 6 inches and a cylindrical height of about 5 inches and an inserted opaque-tint UV-resistant decoration that should cover substantially the entire cylindrical height.

As an alternative, such decoration as formed may have a sufficient thickness to prevent such buckling and crumpling when inserted. However, it is likely the case that decoration cannot be too thick; otherwise, the migrating polycarbonate cannot flow past the interior of the decoration in the mold, or at least such polycarbonate will be too thin interior to the decoration. Moreover, if the decoration is too thick, such decoration will not be flexible enough to the degree necessary for being curved along the length thereof for insertion within the female part of the forming mold.

In fact, although buckling and crumpling is more likely, the decoration as formed should have a relatively minimal thickness, on the order of 0.008 to 0.012 inches, both to allow the migrating polycarbonate to flow past the interior of the decoration and to be flexible enough to the degree necessary for being curved along the length thereof for insertion within the female part of the forming mold. Moreover, and at any rate, a thinner decoration is less costly to produce, at least from a materials point of view.

To positively hold the inserted decoration closely to the cylindrical wall of the female part of the mold, the mold may be provided with an appropriate holding assembly that holds the inserted decoration in place during the molding process. Alternatively, the mold may be provided with an appropriate vacuum assembly that applies a negative pressure to hold the inserted decoration during the molding process. In either case such holding assembly or vacuum assembly adds excessive cost and complexity to the mold and molding process, and therefore to the molded display cover.

Note, too, that the inserted decoration may alternately comprise a polycarbonate or the like deposited by way of a vacuum or a spray onto the female part of the mold. Once again, though, the deposition technology adds excessive cost and complexity to the mold and molding process, and therefore to the molded display cover.

Accordingly, a need exists for a mechanism within the mold that holds the inserted decoration closely to the cylindrical wall of the female part of the mold, especially in the case where the cylindrical wall is relatively tall and the decoration is therefore relatively wide, so that the decoration does not buckle or crumple within the mold such that the introduced polycarbonate is allowed to migrate exterior to the inserted decoration. More particularly, a need exists for such a mechanism within the mold that is generally passive and simple and does not add excessive cost to the mold and molding process, and therefore to the molded display cover.

SUMMARY OF THE INVENTION

The present invention satisfies the aforementioned need by providing a mold assembly for accepting a generally flexible inserted decoration sheet and for molding a generally cylindrical component to include the inserted decoration sheet. The component also includes a cylindrical wall and a closed end.

The mold assembly has a female part generally corresponding to an exterior surface of the component and a male part generally corresponding to an interior surface of the component. The male part is insertable within the female part such that the component is molded therebetween from an introduced mold material.

The female part includes a generally circular wall corresponding to and defining the closed end of the component, a generally cylindrical wall corresponding to and defining the cylindrical wall of the component, and a pair of demarcating ridges on the cylindrical wall of the female part. The pair of ridges accept the inserted decoration therebetween and hold the inserted decoration against the cylindrical wall of the female part. In the course of molding the component to include the inserted decoration, the pair of ridges hold the decoration closely to the cylindrical wall of the female part such that the introduced mold material stays substantially on a side of the inserted decoration opposite the cylindrical wall of the female part.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Certain terminology may be used in the following description for convenience only and is not considered to be limiting. For example, the words "left", "right", "upper", and "lower" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

Figure 1:
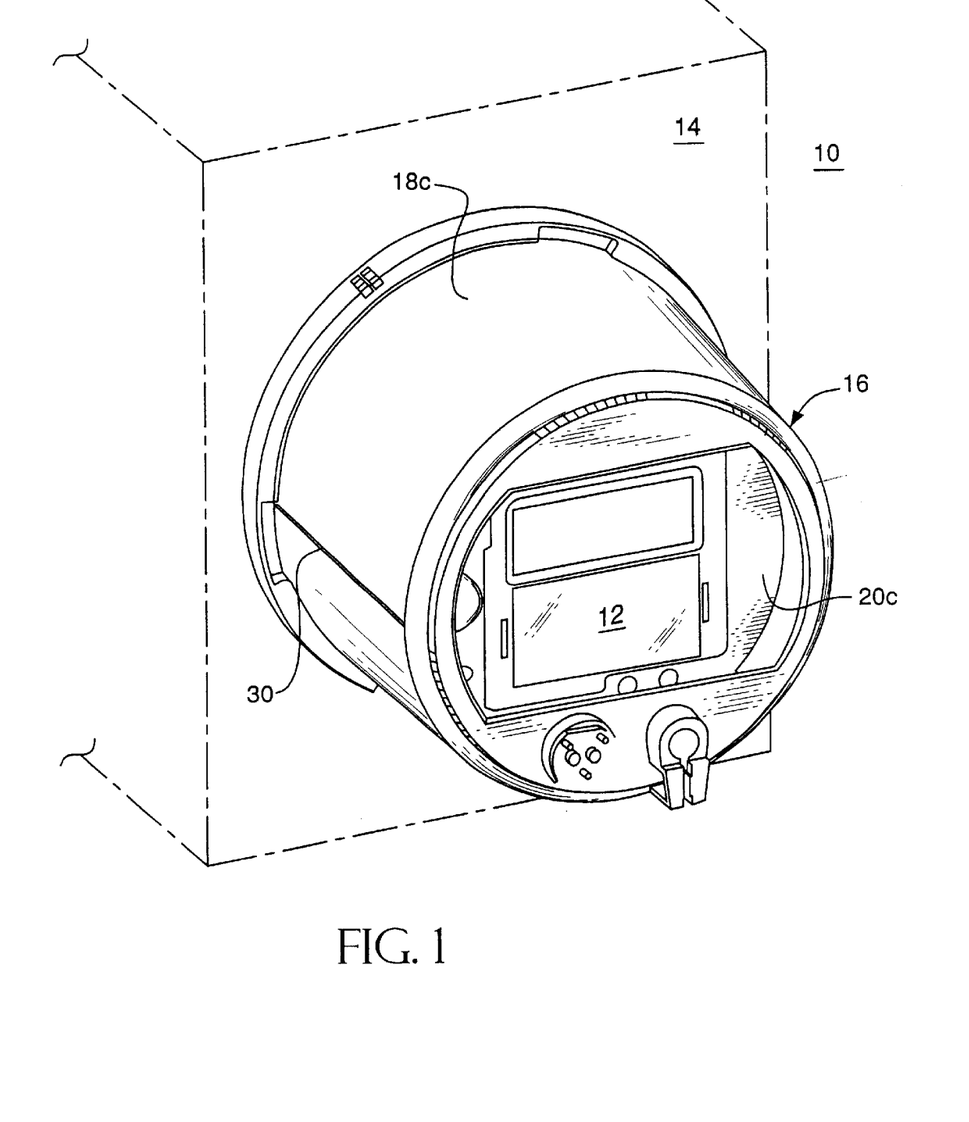
FIG. 1 is a perspective view of an electric meter including a housing, a display, and a display cover.

Referring to the drawings in detail, wherein like numerals are used to indicate like elements throughout, there is shown in FIG. 1 a typical electric meter 10 for metering and displaying electricity usage. As set forth above, the meter 10 typically includes internal machinery and/or circuitry (not shown) for metering the usage of electricity, and a meter display 12 for being read by a meter reader, a customer, etc. The meter display 12 may be electronic or mechanical in nature. As shown, the meter display 12 protrudes from a meter housing 14 and is covered by a display cover 16 that protects the display 12 from external elements and that allows a meter reader, customer, etc. to read the display.

As seen, in FIG. 1, the display cover 16 is generally cylindrical with a cylindrical wall 18c, a closed end 20c through which the display 12 is viewed, and an open end at which the display cover 16 is mounted to the meter housing 14. Thus, the meter display 12 protrudes from the meter housing 14 into the display cover 16 through the open end. As mentioned above, although by no means definitive, the display cover 16 may have an approximate cylindrical diameter of about 6 inches and an approximate cylindrical height of about 5 inches and has a wall thickness of about 0.1 to 0.12 inches.

Notably, although the present invention is disclosed in terms of a display cover 16 mounted to a housing 14, the meter 10 may essentially dispense with the housing 14, in which case substantially all of the meter 10 is within the display cover 16 and the open end thereof is appropriately sealed. Also notably, although the present invention is disclosed primarily in terms of molding the display cover 16 for the electric meter 10, the invention may also be employed for molding a display cover 16 for another type of meter, molding a display cover 16 for a non-meter device, or even molding a device that is not a display cover 16. For example, the present invention may encompass molding a display cover 16 for a water meter (not shown), for molding a generally cylindrical element open at one end such as a drinking glass (not shown), etc.

Figure 2:
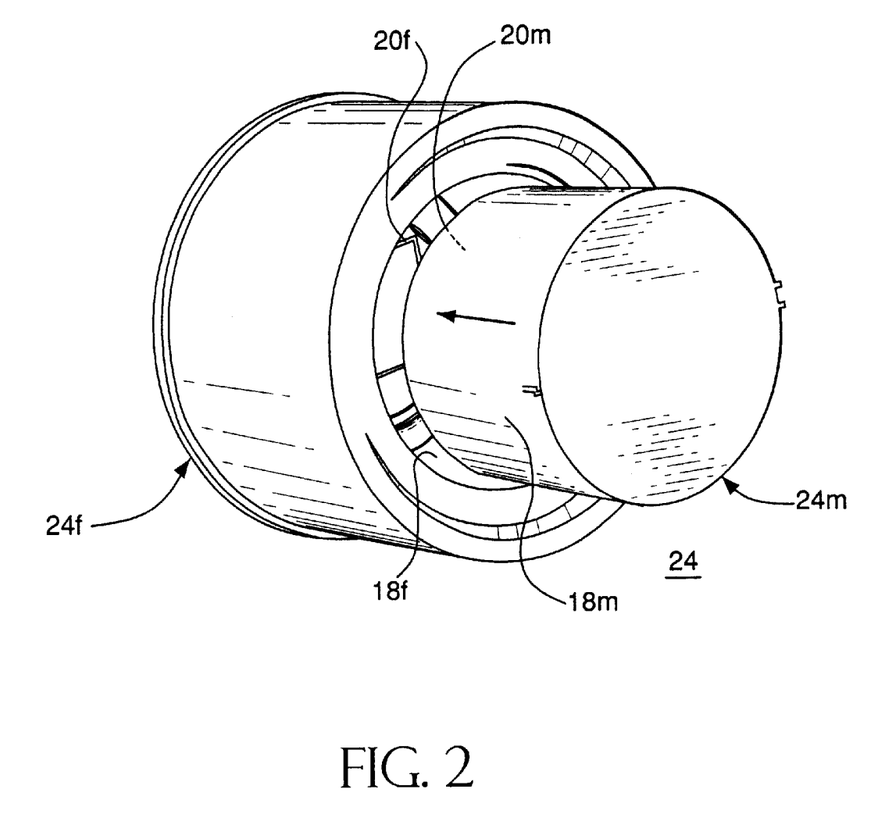
FIG. 2 is an exploded view of a mold assembly for making the display cover of FIG. 1 in accordance with one embodiment of the present invention, and shows the male and female parts that combine to form the mold assembly.

Turning now to FIG. 2, the display cover 16 is formed in a mold assembly (hereinafter 'mold') 24 as a generally unitary body from an elastomeric or plastic material or the like such as the aforementioned clear polycarbonate. Owing to the general structure of the molded cover 16, the forming mold 24 generally includes a female part 24f generally corresponding to the exterior surface of the cover 16 and a male part 24m generally corresponding to the interior surface of the cover 16, where the male part 24m is inserted (in the direction of the arrow, shown) within the female part 24f such that the cover 16 is molded therebetween. Accordingly, each of the male and female parts 24m, 24f includes a generally cylindrical wall 18m, 18f corresponding to and defining the cylindrical wall 18c of the cover 16, and a generally circular wall 20m, 20f corresponding to and defining the circular closed end 20c of the cover 16.

Molding and mold assemblies are generally known or should be apparent to the relevant public, and therefore need not be discussed herein in any detail except insofar as is relevant to the present invention. Accordingly, any appropriate mold and molding process may be employed without departing from the spirit and scope of the present invention as long as the employed mold and molding process include the functional requirements of the present invention.

Figure 3:
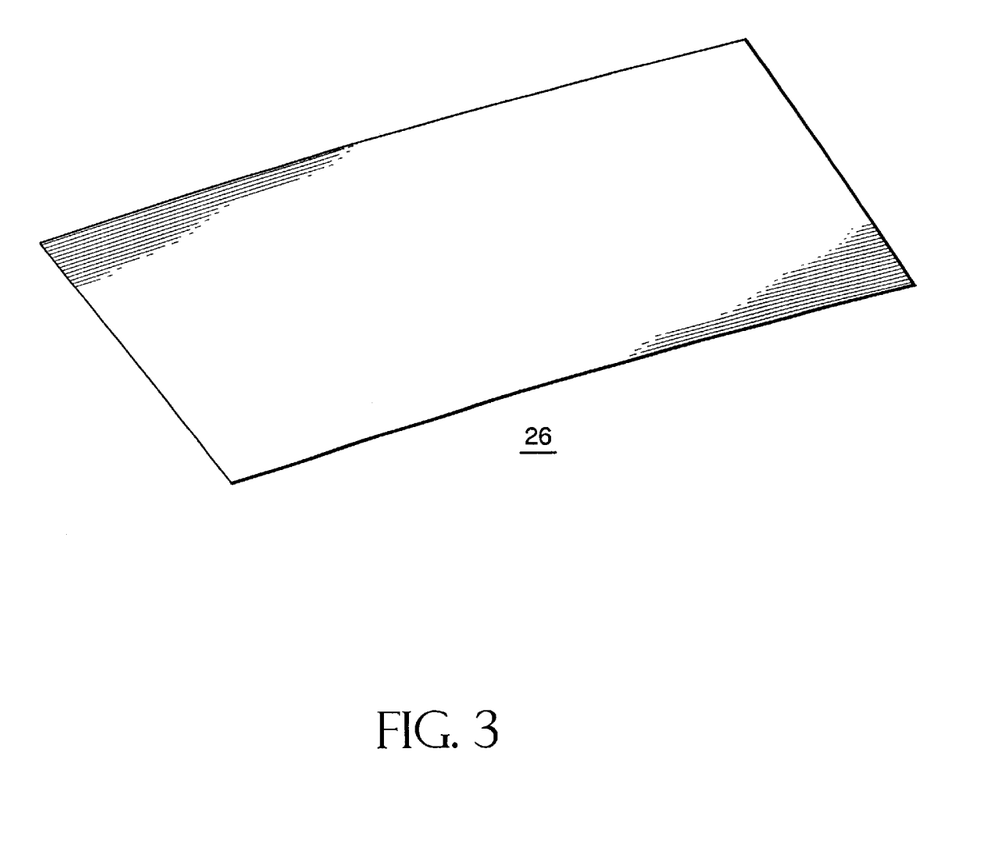
FIG. 3 is a perspective view of an in-mold decoration sheet for being positioned within the female part of the mold of FIG. 2 and held closely to the cylindrical wall thereof.

In the present invention, and referring now to FIG. 3, an in-mold decoration sheet 26 is employed within the mold 24 of FIG. 2 so that the display cover 16 formed within the mold 24 includes such in-mold decoration sheet 26. For example, and as discussed above, an opaque-tint UV-resistant in-mold decoration sheet 26 such as that shown may be included within the mold 24 to form at least a portion of the cylindrical wall 20c of the molded display cover 16. Accordingly, the opaque-tint UVF-resistant decoration 26 imparts the formed display cover 16 with a UV-resistant cylindrical wall 20c that can shade the meter display 12 from exposure to the sun and the like and to prevent dangerous heat build-up on the meter display 12 from exposure to the sun and the like. The in-mold decoration 26 may alternately be any other appropriate decoration 26 without departing from the spirit and scope of the present invention. For example, such decoration 26 may include words, pictures, decorative designs, logos, etc.

The in-mold decoration 26 may be formed from any appropriate material. In the case of a UV-resistant opaque-tint decoration 26 for a meter display cover 16, the material may be a polycarbonate similar to if not identical with the polycarbonate molded to form the remainder of the cover 16, although of course with a UV-resistant opaque tint. Accordingly, the polycarbonate of the decoration 26 and the forming polycarbonate can and generally do fuse to form a substantially unitary cover 16 without any evident physical boundary between the two polycarbonates other than that based on color.

As seen in FIG. 3, the decoration 26 to be inserted is generally a strip. If the decoration 26 is to cover substantially all of the cylindrical wall 20c of the cover 16, the strip has a width generally corresponding to the cylindrical height of the cover 16. Of course, the strip may also have a narrower width, in which case the decoration 26 covers only a portion of the cylindrical wall 20c of the cover 16. The decoration 26 is flexible enough to be curved along the length thereof and inserted within the female part 24f of the forming mold 24. With the decoration 26 so inserted, the male part 24m of the forming mold 24 is coupled to the female part 24f to form a void, and the forming polycarbonate is appropriately introduced to the void to form the display cover 16 (not shown).

As discussed above, in the course of molding the display cover 16 with the inserted decoration 26, the decoration 26 should be held closely to the cylindrical wall 18f of the female part 24f of the mold 24 such that the introduced polycarbonate stays substantially on the side of the inserted decoration 26 opposite the cylindrical wall 18f of the female part 24f (i.e., interior to the inserted decoration 26). The decoration 26 should not be allowed to buckle or crumple within the mold 24 such that the introduced polycarbonate migrates to the side of the inserted decoration 26 facing the cylindrical wall 18f of the female part 24f (i.e., exterior to the inserted decoration 26).

In the prior art, the inserted decoration 26 buckled and crumpled because of a combination of factors including the width of the strip of the decoration 26 and the height of the cylindrical wall 18c/18f, the length of the strip of the decoration 26, the lack of thickness of the strip of the decoration 26, and the lack of any mechanism to hold the strip of the decoration 26 in place within the mold 24, among other things.

Figure 4:
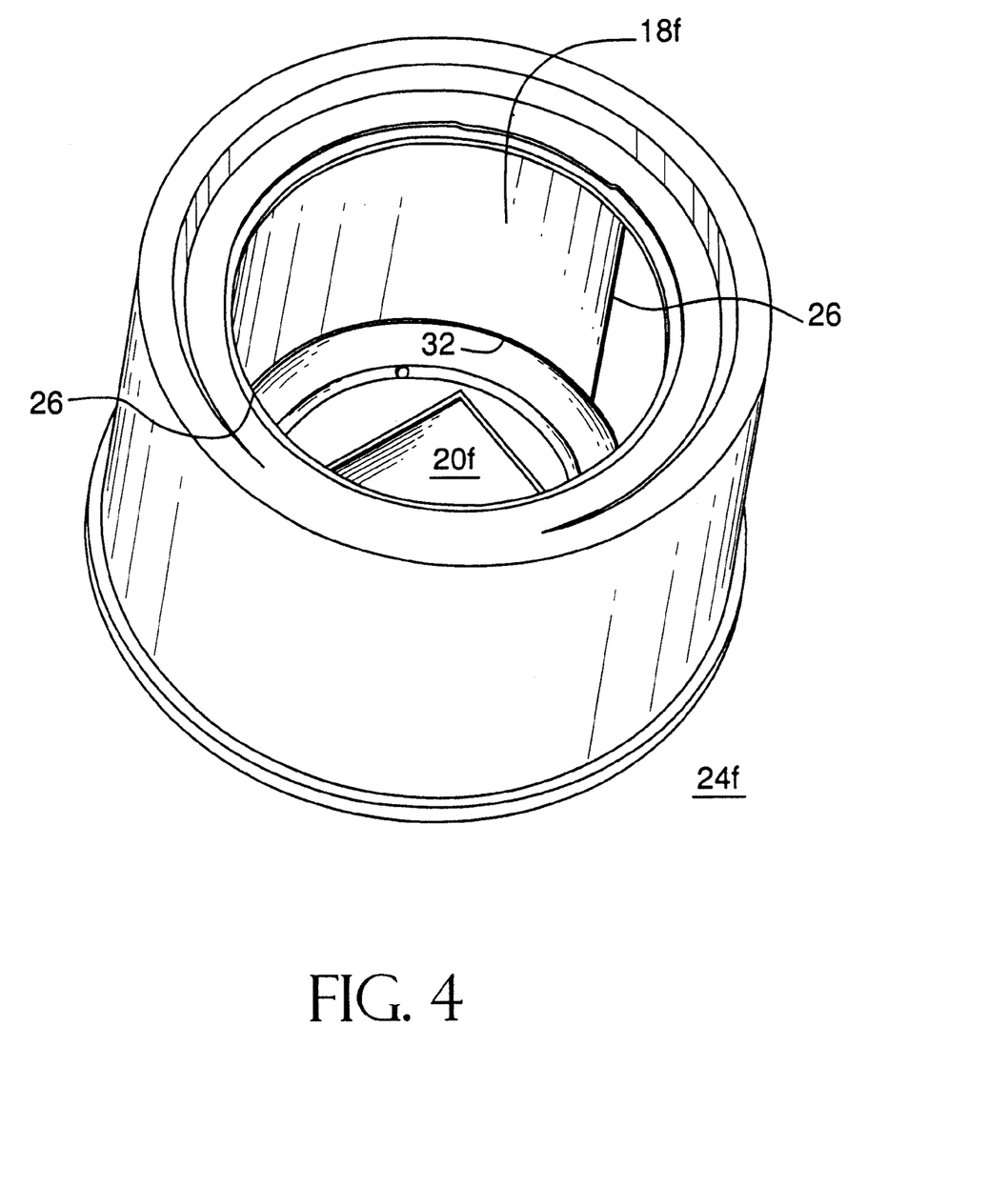
FIG. 4 is a perspective view of the female part of the mold assembly of FIG. 2 in accordance with one embodiment of the present invention, and shows a pair of axially extending ridges on the cylindrical wall thereof for closely holding to such cylindrical wall the in-mold decoration of FIG. 3 as inserted.
Figure 5:
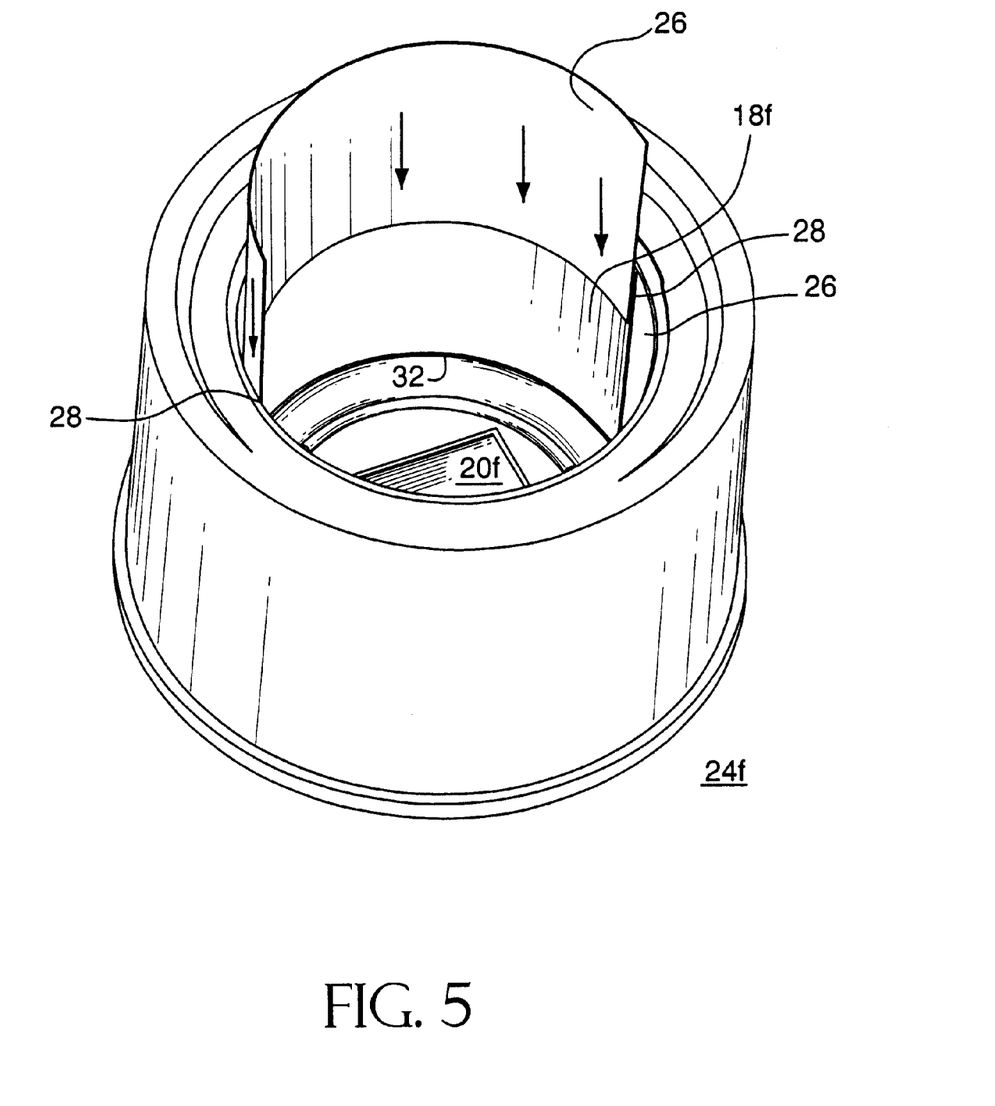
FIG. 5 is another perspective view of the female part of the mold assembly of FIG. 2, and shows the in-mold decoration of FIG. 3 being inserted between the ridges of FIG. 4 and being held closely to the cylindrical wall thereby.

In one embodiment of the present invention, then, and turning now to FIGS. 4 and 5, the inserted decoration 26 is prevented from buckling and crumpling by having a relatively short circumferential extent with respect to the cylindrical wall 18f of the female part 24p of the mold 24, and by providing demarcating ridges 28 on the cylindrical wall 18f of the female part 24f of the mold 24.

In particular, in such embodiment of the present invention, a single inserted decoration 26 that covers the entire circumferential extent of the cylindrical wall 18f/18c of the female part 24f of the mold 24/cover 16 may be replaced by multiple shorted strips of inserted decorations 26, where each shorter strip of decoration 26 is shorter in length than the single inserted decoration 26. For example, if the multiple strips of decoration 26 are to cover such entire circumferential extent, two of the strips may be employed, where each strip covers about 180 degrees of circumferential extent (shown in FIG. 5); three of the strips may be employed, where each strip covers about 120 degrees of circumferential extent (not shown), etc. Alternately, multiple strips of differing lengths may be employed, and the multiple strips may not cover the entire 360 degrees of circumferential extent, all without departing from the spirit and scope of the present invention.

Also in such embodiment of the present invention, each inserted strip of decoration 26 is fitted between a pair of demarcating ridges 28 on the cylindrical wall 18f of the female part 24f of the mold 24. Thus, and as seen in FIGS. 4 and 5, each of the pair of ridges 28 pushes on an opposite edge of the decoration 26 therebetween and in so doing holds the decoration against the cylindrical wall 18f of the female part 24f of the mold 24. As shown, for two strips that cover 360 degrees of circumferential extent, two ridges 28 are provided (shown in FIGS. 4 and 5). Likewise, for three strips that cover 360 degrees of circumferential extent, three ridges 28 are provided (not shown). Of course, for two strips that cover less than 360 degrees of circumferential extent, three ridges 28 would be provided if the two strips are immediately adjacent one another, and four ridges 28 would be provided if the two strips are not immediately adjacent.

As seen in FIGS. 4 and 5, each ridge 28 extends generally linearly and axially with respect to the cylindrical shape of the female part 24f of the mold 24. Such axial alignment is believed to maximize the holding force that each ridge 28 exerts on a corresponding inserted strip of decoration 26. In particular, each ridge 28 exerts such holding force in a direction generally normal to such ridge 28, which in the case of an axially aligned ridge 28 is generally tangential or circumferential and thus toward an opposing ridge 28. Of course, other orientations of the ridges 28 may be employed without departing from the spirit and scope of the present invention so long as the ridges 28 work to hold the inserted decoration(s) 26 against the cylindrical wall 18f of the female part 24f of the mold 24.

As may be appreciated, each shorter strip of decoration 26 and the pair of ridges 28 on either side thereof work in combination in that each pair of ridges 28 supports the shortened strips of decoration 26 to hold same against the cylindrical wall 18f of the female part 24f of the mold 24. In addition, the shorter the strip of decoration 26 and therefore the shorter the distance between the pair of ridges 28, the better the hold by the ridges 28 of the decoration 26 against the cylindrical wall 18f of the female part 24f of the mold 24 and the less likely same will buckle or crumple. Empirically, it has been shown that with a pair of ridges 28 spaced 180 degrees apart in the display cover of FIG. 1 with the dimensions specified above, a corresponding strip of decoration 26 of maximum width can be held with acceptable results, even if such strip has a thickness of 0.008 inches.

Note that the use of ridges 28 on the cylindrical wall 20c of the female part 24f of the mold 24 results in relatively short discontinuities on the cylindrical wall 20c of the formed cover 16. In particular, and as is seen in FIG. 1, each discontinuity 30 corresponds to a ridge 28 and demarcates each individual decoration 26 as formed into the cover 16. However, since each ridge 28 and therefore each discontinuity 30 need only be a millimeter or so in width, if that, each discontinuity 30 is barely noticeable and at any rate does not appreciably detract from the cover 26, either aesthetically or functionally.

In one embodiment of the present invention, in addition to the demarcating ridges 28, the female part 24f of the mold 24 is provided with a generally circumferentially extending abutting ridge 32, as is seen in FIGS. 4 and 5. In particular, such abutting ridge 32 is generally at the juncture of the cylindrical wall 18f and the circular wall 20f of the female part 24f of the mold 24. Further, the abutting ridge 32 is positioned such that a longitudinal side edge of each decoration 26 as inserted abuts against and rests against such abutting ridge 32. As may be appreciated, the abutting ridge 32 thus provides a positive stop when inserting a decoration 26 into the mold 24. Moreover, and importantly, the abutting ridge 32 as positioned directs the flow of introduced polycarbonate during formation of the cover 16 such that the flowing polycarbonate stays interior to the decoration abutting such abutting ridge 32.

In the foregoing description, it can be seen that the present invention comprises a forming mold 24 and mechanism (ridges 28) within the forming mold 24 for holding an inserted decoration 26 closely to the cylindrical wall 18f of the female part 24f of the mold 24, especially in the case where the cylindrical wall 18f is relatively tall and the decoration 26 is therefore relatively wide, so that the decoration 26 does not buckle or crumple within the mold 24, and so that introduced forming material does not migrate exterior to the inserted decoration 26. Moreover, the ridges 28 within the mold 24 are generally passive and simple and do not add excessive cost to the mold 24 and molding process, and therefore to a display cover 16 molded therefrom. It should be appreciated by those skilled in the art that changes could be made to the embodiments described above without departing from the inventive concepts thereof. It is understood, therefore, that this invention is not limited to the particular embodiments disclosed, but it is intended to cover modifications within the spirit and scope of the present invention as defined by the appended claims.

What is claimed is:

1. A mold assembly for accepting a generally flexible inserted decoration sheet and for molding a generally cylindrical component to include the inserted decoration sheet, the component also including a cylindrical wall and a closed end, the mold assembly comprising a female part generally corresponding to an exterior surface of the component and a male part generally corresponding to an interior surface of the component, the male part being insertable within the female part such that the component is molded therebetween from an introduced mold material, the female part including:
   a generally circular wall corresponding to and defining the closed end of the component;
   a generally cylindrical wall corresponding to and defining the cylindrical wall of the component; and
   a pair of demarcating ridges on the cylindrical wall of the female part, the pair of ridges accepting the inserted decoration therebetween and holding the inserted decoration against the cylindrical wall of the female part, wherein in the course of molding the component to include the inserted decoration, the pair of ridges holding the decoration closely to the cylindrical wall of the female part such that the introduced mold material stays substantially on a side of the inserted decoration opposite the cylindrical wall of the female part.

2. The mold assembly of claim 1 wherein each of the pair of ridges exerts a force on an opposite edge of the decoration therebetween.

3. The mold assembly of claim 1 wherein the pair of ridges are spaced apart from each other on the cylindrical wall of the female part a circumferential distance equal to a length of the inserted decoration.

4. The mold assembly of claim 1 for accepting a plurality of inserted decoration sheets and for molding the cylindrical component to include the inserted decoration sheets, the female part including a plurality of demarcating ridges on the cylindrical wall thereof, each decoration being inserted between an immediately adjacent pair of the ridges and being held against the cylindrical wall of the female part thereby.

5. The mold assembly of claim 4 for accepting a pair of inserted decoration sheets and for molding the cylindrical component to include the pair of inserted decoration sheets, the female part including a pair of demarcating ridges on the cylindrical wall thereof, one decoration being inserted to extend between a first side of a first one of the ridges to a first side of a second one of the ridges and being held against the cylindrical wall of the female part thereby, the other decoration being inserted to extend between a second side of the first one of the ridges to a second side of a second one of the ridges and being held against the cylindrical wall of the female part thereby, the pair of decorations thus extending around substantially 360 degrees of circumferential extent of the cylindrical wall of the female part.

6. The mold assembly of claim 5 wherein the pair of demarcating ridges on the cylindrical wall of the female part are spaced 180 degrees apart on the circumferential extent of such cylindrical wall of such female part.

7. The mold assembly of claim 4 for accepting three inserted decoration sheets and for molding the cylindrical component to include the three inserted decoration sheets, the female part including three demarcating ridges on the cylindrical wall thereof, a first one of the three decoration being inserted to extend between a first side of a first one of the ridges to a first side of a second one of the ridges and being held against the cylindrical wall of the female part thereby, a second one of the three decoration being inserted to extend between a second side of a second one of the ridges to a first side of a third one of the ridges and being held against the cylindrical wall of the female part thereby, a third one of the three decoration being inserted to extend between a second side of a third one of the ridges to a second side of the first one of the ridges and being held against the cylindrical wall of the female part thereby, the three decorations thus extending around substantially 360 degrees of circumferential extent of the cylindrical wall of the female part.

8. The mold assembly of claim 7 wherein the three demarcating ridges on the cylindrical wall of the female part are spaced 120 degrees apart on the circumferential extent of such cylindrical wall of such female part.

9. The mold assembly of claim 1 wherein each ridge extends generally axially with respect to a cylindrical shape of the female part of the mold, and wherein each ridge exerts a holding force on the inserted decoration in a direction generally normal to such ridge.

10. The mold assembly of claim 1 wherein the female part further includes a generally circumferentially extending abutting ridge generally at a juncture of the cylindrical wall and the circular wall of the female part, the abutting ridge being positioned such that a longitudinal side edge of the inserted decoration abuts against and rests against such abutting ridge, wherein the abutting ridge as positioned directs the introduced mold material to stay substantially on the side of the inserted decoration opposite the cylindrical wall of the female part.

* * * * *